United States Patent Office 2,866,826
Patented Dec. 30, 1958

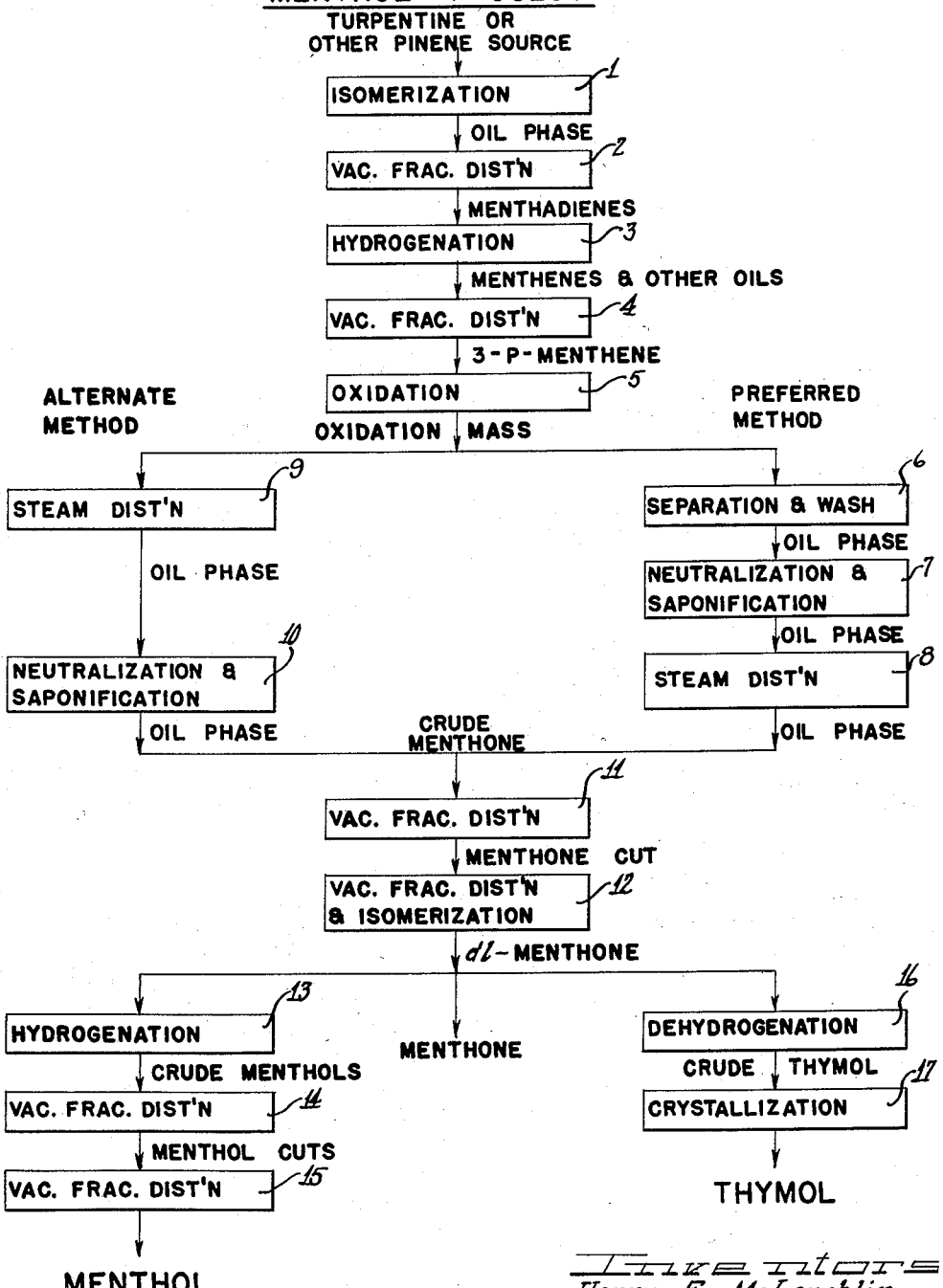

2,866,826

METHOD OF MAKING MENTHOL FROM PINENE

Henry E. McLaughlin, Joseph H. Stump, Jr., and Mason C. Cleere, Pensacola, Fla., assignors, by mesne assignments, to Heyden Newport Chemical Corporation, New York, N. Y., a corporation of Delaware Application May 14, 1953, Serial No. 354,943

14 Claims. (Cl. 260—631)

This invention relates to a method of making menthol, and more particularly to a method starting with mixed p-menthadienes as prepared by the isomerization of pinene-containing materials.

In a co-pending application of Palmer et al., Serial No. 355,183, filed May 14, 1953, now Patent No. 2,799,717, owned by the same assignee as this application, a method is described for the production of mixed p-menthadienes from a source of pinene, such as turpentine, by isomerization in the presence of sulfuric acid as the catalyst to form monocyclic terpene hydrocarbons, or mixed p-menthadienes as they are termed. The mixed p-menthadienes so formed constitute a relatively inexpensive and readily available starting material for the method of our present invention. In contrast, the presently commercially used methods starting with citronellal or para-cresol have a much higher raw material cost.

It is therefore an important object of this invention to provide a method of making menthol from a relatively inexpensive starting material.

It is a further important object of this invention to provide a relatively simple and economically feasible method for the large-scale commercial manufacture of dl-menthol.

Other and further important objects of our invention will become apparent from the following description and appended claims.

Our preferred method, along with an alternative method, is illustrated in the accompanying drawing by a flow sheet.

The flow sheet illustrated in the drawings shows the menthol process of our invention, starting with turpentine or other pinene source. The various steps of our process are shown by legends to which reference numerals have been applied. In the following description, the reference numerals are referred to to designate the corresponding steps shown in the flow sheet.

As the starting material for our method we may employ any suitable source of mixed p-menthadienes. The source that we prefer is that which is produced by the isomerization (1) of pinene using sulfuric acid as the isomerization catalyst. If, for instance, turpentine, which may be steam-distilled wood turpentine, gum turpentine, or sulfate turpentine, is vigorously agitated with 50 to 55% sulfuric acid at a temperature of between 35° C. and 60° C. for seven hours or longer, a mixture of monocyclic terpene hydrocarbons is formed which can be very suitably used in our method of making menthol. The mixed menthadienes resulting from the isomerization of alpha-pinene are largely alpha-terpinene, gamma-terpinene, and isoterpinolene. All of these can be converted in accordance with our method into 3-menthene with greater or lesser ease and varying yields. These menthadienes are preferably separated from other undesirable isomerization products by vacuum fractional distillation (2) before proceeding further.

The next step constitutes the hydrogenation (3) of the now relatively pure p-menthadienes to form 3-p-menthene. Various hydrogenation catalysts and conditions may be employed, but we prefer to use Raney nickel at temperatures below 100° C. and at relatively low pressures such as 100–500 p. s. i. The pressure can be carried as high as several thousand pounds per sq. in. but in the interest of economy we use lower pressures. The temperature should not exceed that temperature at which disproportionation to p-cymene becomes appreciable with the catalyst used. Since for Raney nickel this temperature may be as low as 120° C., the operating temperature is preferably kept below 100° C. with this catalyst.

Any of the customary hydrogenation catalysts such as palladium, copper chromite, supported nickel, and the like, can be used in place of Raney nickel. The hydrogenation is continued until substantially all of the menthadienes have been converted into menthenes.

At the conclusion of the hydrogenation step, the reaction mass is filtered and the crude oil recovered as filtrate. This filtrate oil is subjected to fractional distillation (4) to separate 3-p-menthene from the other oil constituents.

In the next step (5), the 3-p-menthene is subjected to oxidation to form various oxidation products of 3-menthene. The oxidation is effected under atmospheric pressure in a vessel fitted with a mechanical agitator, by means of a per-acid selected from the group consisting of performic and peracetic acids. The acid is formed in situ from formic or acetic acid and hydrogen peroxide. For convenience, the process hereinafter will be described for performic acid, but it will otherwise be the same for peracetic acid.

The 3-p-menthene and a molar excess of formic acid are introduced into the reaction vessel. The hydrogen peroxide is added to this system at such a rate that it is continuously consumed by the reaction as fast as it is introduced. Performic and peracetic acids are hazardous materials and this practice of gradual formation of the per-acid in the presence of a material with which it reacts quickly adds greatly to the safe use of the oxidant. This reaction may be conducted at a temperature between about 0° C. and 70° C. but is most advantageously conducted at between 35° C. and 45° C. No excess over stoichiometric proportions of hydrogen peroxide or formic acid based on the 3-p-menthene content of the system is required. It is advantageous however to use an excess of formic acid in order to hasten the oxidation reaction to completion and to more efficiently use the available hydrogen peroxide, thus improving the yield of desired products.

The oxidation products consist essentially of menthene glycol, the mono- and di-formates of that glycol, and menthene oxide.

The oxidation mass may be further treated in one of two ways. An alternate method consists of charging the entire oxidation mass into a steam-still and steam-distilling (9) the volatile oils either with or without the addition of water and/or an additional organic or mineral acid. In this step of steam-distillation from an acidic medium adjusted, if necessary to have a pH of 0.5–1.3, favorable to the conversion of said oxidation products into menthone, the aforementioned oxidation products are variously hydrolyzed, dehydrated, and/or isomerized to form a crude menthone product. Economically, practical yields of crude menthone may be separated from this distillate by decantation or fractional distillation. After neutralizing free acid and saponifying esters present (10), this crude menthone is ready for vacuum fractional distillation (11) as described below. The formic acid may be rectified and reused in a subsequent oxidation reaction.

The preferred method of treating the oxidation mass consists of separating by decantation the oil phase from the formic acid phase, which is separately rectified for re-use. This oil is washed with water (6) and then treated with 20% caustic soda or potash solution to neutralize any remaining free acid and to saponify (7) the aforementioned esters to give menthene glycol and menthene oxide. This neutralization and saponification step (7), as also the similar step (10) in our alternate method, is achieved with mechanical agitation in about four hours at a temperature of around 80° C. to 90° C. and at atmospheric pressure.

The neutralized oil phase is charged to a still containing water or recycle dilute acid. The system is rendered acidic, preferably in the pH range of 0.5 to 1.3 and most advantageously at a pH of about 0.8 by the addition of a non-volatile acid such as sulfuric, phosphoric, or oxalic. The system is then steam-distilled (8) at atmospheric pressure and at its boiling point in the presence of the dilute acid. Crude menthone is formed by dehydration of menthene glycol and rearrangement of menthene oxide and is separated from the distillate by decantation.

In this steam-distillation step (8), if the pH is numerically much below 0.5 dehydration proceeds to form excessive amounts of hydrocarbons and other undesirable products. It the pH ist numerically above about 1.3 the dehydration of menthene glycol and rearrangement of menthene oxide to menthone proceed too slowly. The simplest way to maintain pH and minimize loss is to continually return to the steam-still the water phase of the steam-distillate, introducing essentially no other water. This operation can be conveniently carried out as a continuous process with infrequent interruption to remove tars accumulating in the steam-still.

Other methods of saponifying and dehydrating the described materials will be evident to those skilled in the art, and are not excluded by the preceding description of a preferred method.

The crude menthone obtained from either the alternate or preferred procedure described for treatment of the oxidation mass is charged to a still. There, any acidity is neutralized with soda ash or other alkali and the menthone is partially refined by vacuum fractional distillation (11), using the equivalent of a 10 plate column. The operating conditions in the column are preferably a pressure of about 30 mm. Hg and a maximum temperature of about 150° C. in the still. The still residue, containing substantial amounts of menthene glycol, may be returned to the just preceding steam-distillation operation.

The menthone cut thus separated is then charged to a menthone fractionating column (12) which is preferably operated at about 50 mm. Hg pressure and 150° C. in the still and which may suitably have the equivalent of 60 theoretical plates. Here again, the distillation is carried out in the presence of a slight excess of alkali which may be supplied by the addition of sodium carbonate. The large number of theoretical plates is required by the small difference in the boiling points of menthone and of the undesirable materials.

The dl-menthone recovered from the menthone fractionating column is next subjected to hydrogenation (13). Various catalysts may be used, such as Raney nickel and palladium, but a copper chromite catalyst such as Adkins' barium-promoted copper chromite catalyst is preferred. The conditions under which hydrogenation of menthone to menthol can be carried out can be widely varied, but for economic reasons again we prefer to use a low pressure such as 400 p. s. i. and a temperature of 160–170° C. There is no upper pressure limit other than that dictated by economics, and with respect to the temperature, that may be varied between 140° C. and 350° C. With a more active catalyst, such as palladium, these temperature limits may be lowered.

At the end of the hydrogenation step the reaction mass is filtered and the filtrate containing crude menthols is run successively through two menthol fractionating columns (14) and (15). Both fractionating columns may suitably have the equivalent of sixty theoretical plates and are operated under similar conditions of pressure and temperature, as for instance at 30 to 50 mm. Hg pressure and a temperature of about 160–170° C. in the still. The dl-menthol cut and/or other desirable menthol cuts from the first column are charged to the second column for production of dl-menthol or other menthols of the highest quality. Undesired isomers of menthol may be returned to the hydrogenating system for isomerization to mixed menthols containing desired isomers. The conditions under which this isomerization takes place are the same as those under which the menthone was originally hydrogenated.

Instead of hydrogenating the menthone to menthols it can be dehydrogenated (16), using palladium or other suitable dehydrogenating catalysts, into thymol, which can be recovered by crystallization (17).

We claim as our invention:

1. The method of making menthol from mixed menthadienes selected from the group consisting of alpha terpinene, gamma terpinene and isoterpinolene and mixtures thereof, which comprises hydrogenating said mixed menthadienes to produce mixed menthenes including 3-p-menthene, subjecting said menthenes to oxidation by means of a per-acid selected from the group consisting of performic and peracetic acid to form oxidation products of said menthenes consisting essentially of menthene glycol, the mono- and di-esters of said glycol and the formic acid or acetic acid derived from said selected acid, and menthene oxide, steam-distilling said reaction products while maintaining the same at a pH between 0.5 and 1.3 to obtain crude menthone, vacuum fractionally distilling said crude menthone and hydrogenating the resulting menthone to menthol.

2. The method of making menthol from mixed menthadienes selected from the group consisting of alpha terpinene, gamma terpinine and isoterpinolene and mixtures thereof, which comprises hydrogenating said mixed menthadienes to produce menthenes including 3-p-menthene, subjecting said menthenes to oxidation by means of a per-acid selected from the group consisting of performic and peracetic acid to form oxidation products of said menthenes consisting essentially of menthene glycol, the mono- and di-esters of said glycol and the formic acid or acetic acid derived from said selected acid, and menthene oxide, neutralizing and saponifying said reaction products, acidifying said reaction products by means of a relatively non-volatile acid to a pH between 0.5 and 1.3, distilling said so acidified reaction products to obtain crude menthone, vacuum fractionally distilling said crude menthone and hydrogenating the resulting menthone to menthol.

3. In a method of making menthol that includes starting with a mixture of menthadienes and hydrogenating said mixed menthadienes to menthenes, the steps which comprise subjecting said menthenes to the oxidizing action of a per-acid selected from the group consisting of performic and peracetic acid, steam-distilling the oxidation products at a pH between 0.5 and 1.3 to produce menthone and hydrogenating said menthone to menthol.

4. In a method of making menthol that includes starting with a mixture of menthadienes selected from the group consisting of alpha terpinene, gamma terpinene and isoterpinolene and mixtures thereof and hydrogenating said mixed menthadienes to menthenes including 3-p-menthene, the steps which comprise subjecting said menthenes to the oxidizing action of a per-acid selected from the group consisting of performic and peracetic acid to produce oxidation products consisting essentially of menthene glycol, the mono- and di-esters of that glycol and the formic acid or acetic acid derived from said selected acid, and menthene oxide, steam-distilling the oxidation products at a pH of about 0.8 to produce menthone and hydrogenating said menthone to menthol.

5. In a method of making menthol from mixed menthadienes selected from the group consisting of alpha terpinene, gamma terpinene and isoterpinolene and mixtures thereof, the steps that comprise hydrogenating said mixed menthadienes to obtain 3-p-menthene, oxidizing said 3-p-menthene by a per-acid formed in situ and selected from the group consisting of performic and peracetic acids to produce oxidation products consisting essentially of menthene glycol, mono- and di-formates of menthene glycol and menthene oxide, separating said oxidation products as an oil phase, neutralizing and saponifying said oil phase, steam-distilling said neutralized oil phase in the presence of an aqueous phase having a pH between 0.5 and 1.3 to obtain crude menthone, vacuum fractionally distilling the crude menthone to produce a menthone cut, and hydrogenating said menthone cut to produce menthol.

6. In a method of making menthol from mixed menthadienes selected from the group consisting of alpha terpinene, gamma terpinene and istoterpinolene and mixtures thereof, the steps that comprise hydrogenating said mixed menthadienes to obtain 3-p-menthene, oxidizing said 3-p-menthene by a performic acid formed in situ at a temperature not over 70° C. to produce oxidation products consisting essentially of menthene glycol, mono- and di-formates of menthene glycol and menthene oxide, separating said oxidation products as an oil phase, neutralizing and saponifying said oil phase, steam-distilling said neutralized oil phase in the presence of an aqueous phase having a pH between 0.5 and 1.3 to obtain crude menthone, vacuum fractionally distilling the crude menthone to produce a menthone cut, and hydrogenating said menthone cut to produce menthol.

7. In a method of making menthol from mixed menthadienes selected from the group consisting of alpha terpinene, gamma terpinene and isoterpinolene and mixtures thereof, the steps that comprise hydrogenating said mixed menthadienes to obtain 3-p-menthene, oxidizing said 3-p-menthene by a performic acid formed in situ to produce oxidation products consisting essentially of menthene glycol, mono- and di-formates of menthene glycol and menthene oxide, separating said oxidation products as an oil phase, neutralizing and saponifying said oil phase, steam distilling said neutralized oil phase in the presence of an aqueous phase having a pH of about 0.8 to obtain crude menthone, vacuum fractionally distilling the crude menthone to produce a menthone cut, and hydrogenating said menthone cut to produce menthol.

8. In a method of making menthol from mixed menthadienes selected from the group consisting of alpha terpinene, gamma terpinene and isoterpinolene and mixtures thereof, the steps that comprise hydrogenating said mixed menthadienes to obtain 3-p-menthene, oxidizing said 3-p-menthene by performic acid formed in situ at a temperature between 35 and 45° C. to produce oxidation products consisting essentially of menthene glycol, mono- and di-formates of menthene glycol and menthene oxide, separating said oxidation products as an oil phase, neutralizing and saponifying said oil phase, steam distilling said neutralized oil phase in the presence of an aqueous phase having a pH between 0.5 and 1.3 to obtain crude menthone, vacuum fractionally distilling the crude menthone to produce a menthone cut, and hydrogenating said menthone cut to produce menthol.

9. In a method of making menthol from mixed menthadienes selected from the group consisting af alpha terpinene, gamma terpinene and isoterpinolene and mixtures thereof, the steps which comprise hydrogenating the mixed menthadienes to menthenes, subjecting said menthenes to the action of performic acid produced in situ by the reaction between hydrogen peroxide and formic acid to produce oxidation products consisting essentially of menthene glycol, mono- and di-esters of said glycol and menthene oxide, separating an oil phase containing said reaction products, neutralizing and saponifying said oil phase, steam-distilling said oil phase in the presence of an aqueous phase having a pH between 0.5 and 1.3 to obtain crude menthone, hydrogenating said menthone to menthol and recovering said menthol.

10. In a method of making menthol from mixed menthadienes selected from the group consisting of alpha terpinene, gamma terpinene and isoterpinolene and mixtures thereof, the steps which comprise hydrogenating the mixed menthadienes to menthenes, subjecting said menthenes at a temperature of 35 to 45° C. to the action of performic acid produced in situ by the reaction between hydrogen peroxide and formic acid to produce oxidation products consisting essentially of menthene glycol, mono- and di-formates of said glycol and menthene oxide, separating an oil phase containing said reaction products, neutralizing and saponifying said oil phase, steam-distilling said oil phase in the presence of an aqueous phase having a pH between 0.5 and 1.3 to obtain crude menthone, hydrogenating said menthone to menthol and recovering said menthol.

11. In a method of making menthol from mixed menthadienes selected from the group consisting of alpha terpinene, gamma terpinene and isoterpinolene and mixtures thereof, the steps which comprise hydrogenating the mixed menthadienes to menthenes, subjecting said menthenes to the action of a per-acid produced in situ by the reaction between hydrogen peroxide and an acid selected from the group consisting of formic acid and acetic acid to produce oxidation products consisting essentially of menthene glycol, mono- and di-esters of said glycol and the selected acid, and menthene oxide, separating an oil phase containing said reaction products, neutralizing and saponifying said oil phase, steam-distilling said oil phase in the presence of an aqueous phase having a pH between 0.5 and 1.3 due to the presence of a non-volatile acid to obtain crude menthone, hydrogenating said menthone to menthol and recovering said menthol.

12. In a method of making menthol from mixed menthadienes selected from the group ocnsisting of alpha terpinene, gamma terpinene and isotherpinolene and mixtures thereof, the steps which comprise hydrogenating the mixed menthadienes to menthenes, subjecting said menthenes at a temperature of 35 to 45° C to the action of a per-acid produced in situ by the reaction between hydrogen peroxide and an acid selected from the group consisting of formic acid and acetic acid to produce oxidation products consisting essentially of menthene glycol, mono- and di-esters of said glycol and said selected acids, and menthene oxide, separating an oil phase containing said reaction products, neutralizing and saponifying said oil phase, steam-distilling said oil phase in the presence of an aqueous phase having a pH between 0.5 and 1.3 due to the presence of a non-volatile acid to obtain crude menthone, hydrogenating said menthone to menthol and recovering said menthol.

13. The method of making menthol from mixed menthadienes selected from the group consisting of alpha terpinene, gamma terpinene and isoterpinolene and mixtures thereof produced by the sulfuric acid isomerization of pinene-containing material, which comprises hydrogenating said mixed menthadienes to produce menthenes including 3-p-menthene, vacuum fractionally distilling said menthenes to obtain 3-p-menthene, subjecting said 3-p-menthene at temperatures of from 35 to 45° C. to the oxidizing action of a per-acid produced in situ by the reaction of hydrogen peroxide and an acid selected from the group consisting of formic acid and acetic acid to produce oxidation products consisting essentially of menthene glycol, the mono- and di-esters of that glycol and the selected acid, and menthene oxide, separating and washing an oil phase containing said oxidation products, neutralizing and saponifying said oxidation products, steam-distilling said oil phase containing said neutralized and saponified oxidation products in the presence of an aqueous phase having a pH between 0.5 and 1.3 to produce crude menthone, vacuum fractionally distilling said crude menthone, hydrogenating said distilled menthone to menthol, vacuum fractionally distilling the resulting menthol and recovering menthol.

14. In a method of making menthol from 3-p-menthene, the steps which comprise subjecting said 3-p-menthene at temperatures between 0 and 70° C. to the oxidizing action of performic acid formed in situ from formic acid and hydrogen peroxide, the hydrogen peroxide being added gradually at a rate such that the same is consumed substantially as rapidly as added, producing by said oxidizing action oxidation products consisting essentially of menthene glycol, the mono- and di-formates of menthene glycol and menthene oxide, separating the resulting oil phase containing said oxidation products, neutralizing and saponifying the oil phase to give menthene glycol and menthene oxide, acidifying the saponified oil phase to a pH within the range of 0.5 to 1.3 by the addition of a non-volatile acid, steam distilling the acidified oil phase to produce menthone and hydrogenating said menthone to menthol.

References Cited in the file of this patent

UNITED STATES PATENTS

| | | |
|---|---|---|
| 1,811,711 | Blagden | June 23, 1931 |
| 1,946,115 | Schoeller et al. | Feb. 6, 1934 |
| 2,500,599 | Bergsteinsson et al. | Mar. 14, 1950 |
| 2,555,927 | Himel et al. | June 5, 1951 |
| 2,714,602 | Abbott | Aug. 2, 1955 |

OTHER REFERENCES

Winterfield et al.: Synthetic Menthol, pp. 112 to 114, published by Gwandon-Delawanna, Inc., N. Y., 1944.

Smith et al.: Journal of the American Chemical Society, vol. 71, 1949, pp. 3765 to 3769.

Swern: Organic Reactions, vol. VII (1953), Wiley & Sons, N. Y., pp. 380–90.